F. P. DUNN.
SCALE.
APPLICATION FILED APR. 12, 1913.
1,249,927.
Patented Dec. 11, 1917.
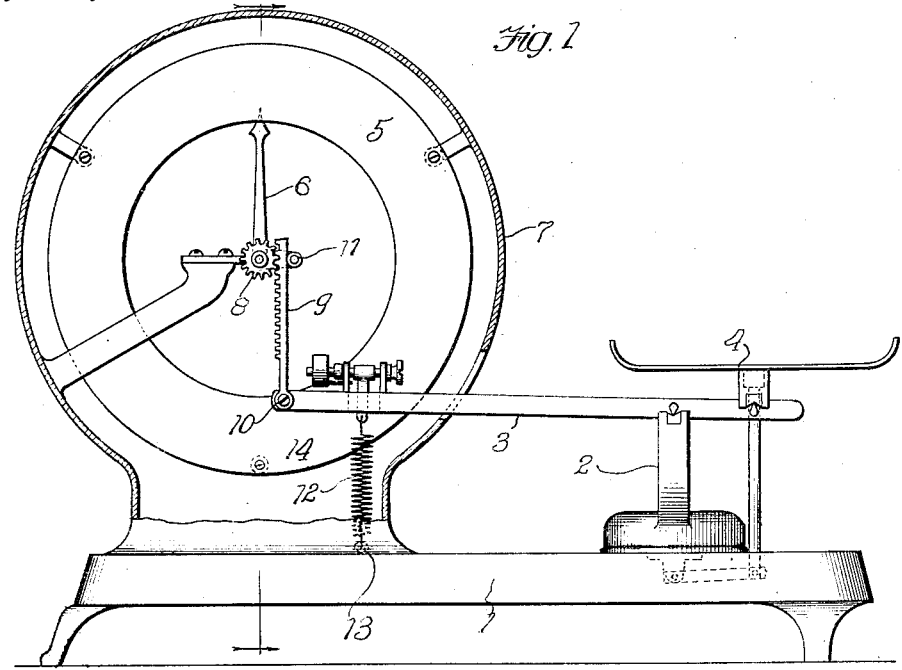
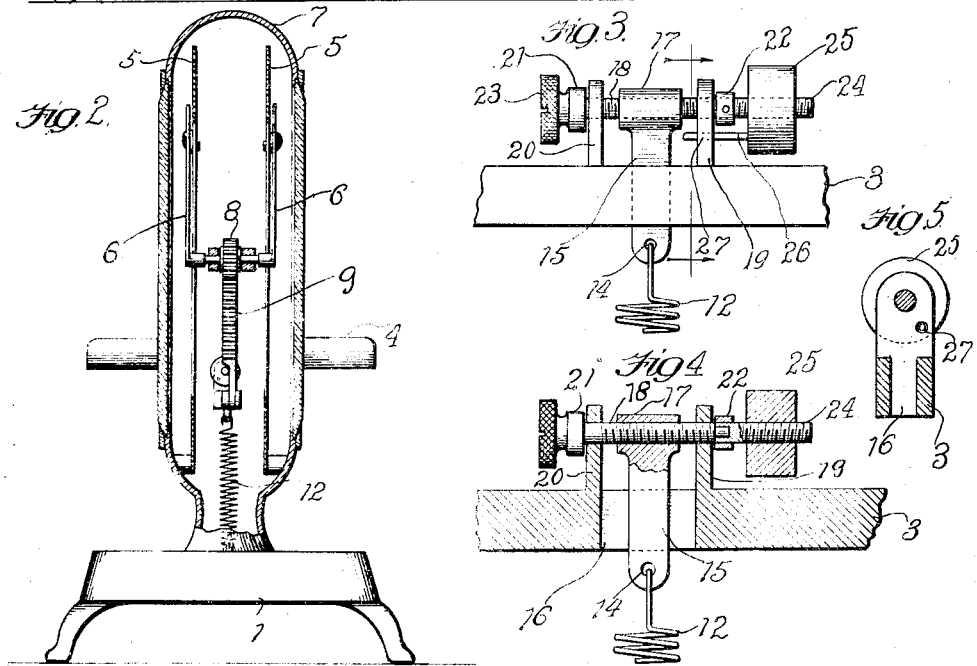
Witnesses
Martin H. Olsen
Robert Dobberman
Inventor
Frank P. Dunn
By Rector Hibben Davis & Macauley
Att'ys.

UNITED STATES PATENT OFFICE.

FRANK P. DUNN, OF ANDERSON, INDIANA, ASSIGNOR TO TOLEDO SCALE COMPANY, OF TOLEDO, OHIO, A CORPORATION OF NEW JERSEY.

SCALE.

1,249,927.   Specification of Letters Patent.   Patented Dec. 11, 1917.

Application filed April 12, 1913. Serial No. 760,733.

*To all whom it may concern:*

Be it known that I, FRANK P. DUNN, a citizen of the United States, residing at Anderson, in the county of Madison and State of Indiana, have invented certain new and useful Improvements in Scales, of which the following is a specification.

My invention relates more particularly to the class of beam scales in which a spring is employed as the means for offsetting the load or article to be weighed. Ordinarily these scales comprise a beam which is a lever of the first order having the load receiver or platform upon one side of the fulcrum and the spring for counterbalance or offsetting the load at the other side of the fulcrum as well as a dial and hand or other means for indicating the weight of the load or commodity being weighed. Perhaps the most serious defect of scales of this character is that the spring is subject to variation with change of temperature, not only elongating with a rise of temperature but also becoming weaker or losing its tension, so that the beam moves a greater distance for the same load or weight in the scale pan when it is warm than it does when cold and consequently the dial or other indicator reads larger in warm weather than in cold. It is the purpose of my invention to provide a manual adjustment for these variations in the tension of the spring in scales of this character without at the same time introducing other errors.

In the accompanying drawings I have shown, and in the following specification, describe in detail a preferred form of scale embodying my invention. It is to be understood, however, that the specific disclosure is for the purpose of exemplification only, and that the scope of my invention is set forth in the following claims in which I have endeavored to distinguish it from the prior art so far as known to me without, however, relinquishing any portion thereof.

In the accompanying drawings Figure 1 is a side elevation partly in section of the preferred form of scale, Fig. 2, an end elevation also partly in section, and Figs. 3, 4, and 5, enlarged details of the part with which my invention is more particularly concerned, in elevation and longitudinal and transverse section respectively. The base 1 of the scale, fulcrum 2, beam 3, load receiver or scale pan 4, dial 5, and indicator hand 6 are or may be of any usual or preferred form, the dial being closed in a suitable casing 7, mounted upon the end of the base. Any suitable means may be employed for operating the dial hand and I have shown for this purpose a pinion 8 upon the shaft of the pointer operated by a rack 9, pivoted at 10 to the end of the scale beam and held in mesh with the pinion by a guide 11. The load offsetting or counterbalancing spring 12 is secured to the base at 13 and at is upper end is connected to an eye 14, adjustably mounted upon the scale beam. For the purpose of adjustably securing the eye 14, it is formed in an arm 15, extending through a slot 16 in the end of the beam and provided at its other end with a nut 17, which is threaded upon a screw shaft 18, journaled in perforated lugs 19—20, mounted upon the scale beam. On opposite sides of the lugs the screw shaft is provided with collars 21—22 for preventing longitudinal displacement of the screw with reference to the lugs, and at one end with a thumbpiece 23, for turning the screw. Obviously by rotating the screw in one direction or the other, the point of attachment of the spring may be shifted toward or from the fulcrum of the beam. Beyond the lug 19 the screw shaft 18 is extended at 24 a sufficient distance to receive the counterbalance weight 25, which is also in screw engagement with the shaft, but the thread is reversely inclined with reference to the thread upon which the nut 17 is mounted. The counter balance weight 25 is provided with a pin 26, which projects into a hole 27, in the lug 19 and permits the longitudinal movement of the counterbalance weight but prevents rotation thereof. Obviously the counterbalance weight 25 is also adjusted longitudinally of the beam by rotating the screw shaft but in a reverse direction to that of the spring attaching eye 14.

Whenever the tension of the spring changes from any cause such as change in the temperature, the scale may be restored to correct reading by adjusting the point of attachment thereof toward or from the fulcrum of the beam depending upon the nature of the change in the spring. Thus, for example, when the temperature rises and the spring is correspondingly weakened, its counterbalancing effect may be increased by increasing the distance of the point of attachment from the fulcrum of the beam;

and in case of a drop in the temperature a reverse adjustment may be made so that the scale may be maintained in proper condition and adjustment. By moving the attachment of the spring, however, in the manner stated, the balance of the beam would be destroyed were not provision made to guard against it. It is for this purpose that the counterbalance 25 is provided and its weight is so proportioned to that of the spring and connected parts that by moving it in the opposite direction, as provided for, it at all times balances the spring and connected parts, and thereby prevents any disturbance of the equilibrium of the scale due to the shifting of the parts.

I claim:

1. In a scale of the class described, and in combination with the base, platform and load-receiver thereof, a spring attached at one end to the base, attaching means connected to the other end of the spring and mounted upon the beam and adjustable lengthwise thereof, a counterbalance weight likewise adjustable longitudinally of the beam, and means common to the attaching means and the counterbalance weight for shifting them in opposite directions.

2. In a scale of the class described and in combination with the base platform and load receiver thereof, a spring attached at one end to the base, attaching means connected to the other end of the spring and adjustable lengthwise of the beam, a counterbalance weight likewise adjustable longitudinally of the beam, and manually operated means common to the attaching means and the counterbalance weight for shifting them in opposite directions.

3. In a scale of the class described and in combination with the base, beam, and goods receiver thereof, a spring for offsetting the weight of the goods secured at one end to the base, a screw mounted upon the beam and extending longitudinally thereof, a nut on the screw and an eye connected to the nut and attached to the end of the spring.

4. In a scale of the class described and in combination with the base, beam, and load receiver thereof, a spring attached at one end to the base, a revoluble screw mounted upon the beam and having reversely threaded screw portions, means for the attachment of the end of the spring mounted upon one of said portions of the screw, and a counterbalance weight mounted upon the other portion of the screw.

5. In a scale of the class described and in combination with the base, beam, and load receiver thereof, a spring attached at one end to the base, a revoluble screw mounted upon the beam and having reversely threaded screw portions, means for attachment of the end of the spring mounted upon one of said portions of the screw, a counterbalance weight on the other portion, and a pin on the weight engaging a relatively stationary member to prevent the rotation of the counterbalance weight.

6. In a scale of the class described and in combination with the base, beam, and load receiver thereof, a spring attached at one end to the base, a pair of lugs 19 and 20, mounted upon the beam, a screw 18 revolubly mounted in the lugs, a finger piece 23 for turning the screw, the screw being formed with reversely threaded sections, a nut 17 carrying an eye 14 to which said spring is attached, mounted upon one of the threaded portions of the screw and a counterbalance weight 25 having a pin 26 engaging the lug 19, mounted upon the other section of the screw.

7. In a scale and in combination with the frame thereof, a beam having a slot therein, a spring secured at one end upon the frame, an arm extending through the slot in the beam to which the other end of the spring is secured, a manually movable member supported by and arranged parallel to the beam, and means for connecting the arm to said movable member for adjustment longitudinally of the beam.

FRANK P. DUNN.

Witnesses:
R. E. KREIGH,
A. F. BRADLY.